United States Patent
Wurster et al.

(10) Patent No.: US 12,334,783 B2
(45) Date of Patent: Jun. 17, 2025

(54) JOINING TOOL FOR PRESSING A DISK TO A SHAFT, AND ROTOR SHAFT FOR AN ELECTRIC MACHINE

(71) Applicant: Dr. Ing. h.c. F. Porsche Aktiengesellschaft, Stuttgart (DE)

(72) Inventors: Peter Wurster, Kornwestheim (DE); Niklas Lamparsky, Leonberg (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 648 days.

(21) Appl. No.: 17/690,567

(22) Filed: Mar. 9, 2022

(65) Prior Publication Data
US 2022/0352794 A1 Nov. 3, 2022

(30) Foreign Application Priority Data
Apr. 30, 2021 (DE) ............. 10 2021 111 191.9

(51) Int. Cl.
*H02K 15/03* (2025.01)
*B23P 11/00* (2006.01)
(Continued)

(52) U.S. Cl.
CPC .............. *H02K 15/03* (2013.01); *B23P 11/00* (2013.01); *B23P 19/02* (2013.01); *F16D 1/072* (2013.01);
(Continued)

(58) Field of Classification Search
CPC ......... Y10T 29/53983; Y10T 29/53961; Y10T 29/53826; Y10T 29/53796;
(Continued)

(56) References Cited

U.S. PATENT DOCUMENTS 3,597,835 A * 8/1971 Scaillet ............... H02K 15/028
29/520
3,786,561 A * 1/1974 Busian .................. H02K 15/16
29/520
(Continued)

FOREIGN PATENT DOCUMENTS

CN 211360347 U 8/2020
JP 2004-343970 12/2004
(Continued)

OTHER PUBLICATIONS

German Search Report dated Feb. 1, 2022.

*Primary Examiner* — Tyrone V Hall, Jr.
(74) *Attorney, Agent, or Firm* — Gerald E. Hespos; Michael J Porco

(57) ABSTRACT

A joining tool (10) is provided for pressing a disk (12) to a shaft (14) that has opposite first and second ends. The first end (18) of the shaft (14) is received in a press table (22) and the second end (24) of the shaft (14) is received in a centering receptacle (26). A press plate (34) axially presses the disk (12) onto the shaft (14). A resilient ram (40) is provided on a side of the press plate (34) that faces toward the disk (12) and compensates for an axial run-out of the disk (12) relative to the press plate (34). The resilient ram (40) of the joining tool (10) enables the disk (12) that has an axial run-out to be pressed onto the shaft (14) in a correspondingly sloped manner, with the result that a rotor shaft (16) with a satisfactory bond is made possible.

9 Claims, 2 Drawing Sheets

(51) Int. Cl.
    *B23P 19/02*     (2006.01)
    *F16D 1/072*     (2006.01)
    *H02K 1/278*     (2022.01)

(52) U.S. Cl.
    CPC ......... *H02K 1/278* (2013.01); *H02K 2201/06* (2013.01)

(58) Field of Classification Search
    CPC . Y10T 29/53717; B30B 15/061; F16D 1/072; H02K 15/03; H02K 15/028; H02K 1/28
    See application file for complete search history.

(56) References Cited

U.S. PATENT DOCUMENTS

| | | | | |
|---|---|---|---|---|
| 3,990,141 | A * | 11/1976 | Stark | H02K 15/028 |
| | | | | 310/91 |
| 6,122,817 | A * | 9/2000 | Meacham | H02K 1/28 |
| | | | | 310/216.127 |
| 8,847,462 | B2 | 9/2014 | Filgertshofer | |
| 2017/0012481 | A1 | 1/2017 | Ballweg et al. | |
| 2019/0140502 | A1* | 5/2019 | Jung | H02K 1/2773 |
| 2019/0181733 | A1 | 6/2019 | Kinpara | |

FOREIGN PATENT DOCUMENTS

| | | | |
|---|---|---|---|
| JP | 2004343970 A | * | 12/2004 |
| JP | 2005295745 | | 10/2005 |
| JP | 2011019298 | | 1/2011 |
| JP | 2013146186 | | 7/2013 |
| JP | 2018-182795 | | 11/2018 |
| JP | 2018182795 A | * | 11/2018 |
| KR | 10-2013-0064233 | | 6/2013 |
| KR | 10-2018-0034794 | | 4/2018 |

* cited by examiner

JOINING TOOL FOR PRESSING A DISK TO A SHAFT, AND ROTOR SHAFT FOR AN ELECTRIC MACHINE

CROSS REFERENCE TO RELATED APPLICATION

This application claims priority under 35 USC 119 to German Patent Appl. No. 10 2021 111 191.9 filed on Apr. 30, 2021, the entire disclosure of which is incorporated herein by reference.

BACKGROUND

Field of the Invention

The invention relates to a joining tool for pressing a disk to a shaft, and to a rotor shaft for an electric machine where the rotor shaft can be produced with the aid of the joining tool so that a satisfactory bond can be achieved for a rotor shaft.

Related Art

U.S. Pat. No. 8,847,462 discloses pushing laminated cores in an axial direction onto a rotor shaft that has radially projecting structural elements. The inner edge of the laminated cores is deformed plastically by the structure elements of the rotor shaft to achieve in a positively locking connection in the circumferential direction.

There is a constant need for rotor shafts with a satisfactory bond.

It is an object of the invention to provide a rotor shaft with a satisfactory bond.

SUMMARY

One aspect of the invention relates to a joining tool for pressing a disk to a shaft that has opposite first and second ends. The joining tool has a press table for receiving the first end of the shaft. The press table may be configured so that the shaft cannot rotate. The joining tool also has a centering receptacle for receiving the second end of the shaft and a press plate for axially pressing the disk onto the shaft. A resilient ram is provided on a side of the press plate that points toward the disk for compensating for an axial run-out of the disk relative to the press plate.

The first and second ends of the shaft can be received respectively in the press table and in the centering receptacle. Thus, the shaft can be held firmly in a defined position when subjected to forces that act when pressing the disk onto the shaft. To this end, the first end of the shaft may have a noncircular shape, for example, a shape to achieve tongue and groove connection, so that the shaft can be secured against rotation in the press table in a positively locking and non-rotatable manner. In particular, the rotational axis or the longitudinal axis of the shaft may be oriented substantially parallel to the pressing direction of the press plate. The press plate enables a force to be exerted on the disk in the axial direction of the shaft. The force is sufficiently great to enable a radially inner edge of the disk to be deformed plastically on structural elements that run in a rib-shaped manner in the axial direction of the shaft. Thus, a substantially play-free spline system exists between the disk and the shaft that has the structural elements. Accordingly, a press fit can be achieved in the region of the spline system that is configured to achieve plastic deformation of the disk. To this end, the shaft and/or the structure elements can have a higher strength than the disk. The disk may be configured as a laminated core with a plurality of laminations and has permanent magnets that are offset in the circumferential direction with respect to one another so that a rotor shaft for an electric machine can be configured. In particular, a plurality of disks can be pressed behind one another in the axial direction onto the shaft with the aid of the joining tool.

Disks that are pressed to the shaft may have an axial run-out that is provided deliberately or is accepted knowingly. Axial run-out defines a situation where the designated rotational axis of the shaft or the disk is not perpendicularly to an axial end or with respect to the two axial end sides of the disk. For example, a disk that has an axial run-out may have an end plane that is sloped by an angle with respect to the radial plane that runs perpendicular to the rotational axis. If the press plate acted directly on that end of the disk that points toward the press plate, the end of the disk would be oriented flat on the press plate. Accordingly, the axial run-out of the disk would be canceled and the radially inner edge of the disk would run in a sloped manner with respect to the shaft. This would lead to an impaired bond of the disk to the shaft.

However, the resilient ram is provided between the press plate and the disk during pressing of the disk onto the shaft in the axial direction. The ram between the press plate and the disk can be compressed somewhat, and can be compressed to different extents in the circumferential direction. The ram can be compressed to a more pronounced effect in those circumferential angle regions of the disk where the disk is positioned closer to the press plate due to its axial run-out. On the other hand, the ram can be compressed to a less pronounced extent in those circumferential angle regions of the disk where the disk is positioned farther away from the press plate due to its axial run-out. This design enables the ram to fill an intermediate region that is, for example, substantially wedge-shaped, between the press plate, oriented perpendicular to the rotational axis of the shaft, and the side of the disk that is sloped with respect to the radial plane of the shaft. Thus, the ram can compensate for the axial run-out of the disk. As a result, the disk can be loaded by the press plate with a mechanical stress that is homogeneous in the circumferential direction, while at the same time the slope caused by the axial run-out of the disk with respect to the radial plane of the shaft, and the correct orientation of the radially inner edge of the disk are maintained. Accordingly, the radially inner edge of the disk is oriented substantially coaxially with respect to the rotational axis of the shaft to ensure a satisfactory bond of the disk to the shaft despite the axial run-out. Therefore, the resilient ram of the joining tool enables the disk that has an axial run-out to be pressed in a correspondingly sloped manner onto the shaft and ensures that a rotor shaft with a satisfactory bond is made possible.

The press plate can be coupled to the press table such that it can be displaced linearly. The press plate can be guided via, for example, four guide columns. In particular, at least one spring element, for example a compression spring which is plugged onto the guide column, is provided between the press plate and the press table to press the press plate away from the disk automatically if a pressing force is substantially no longer applied in a load-free state. The pressing force that is required to press the disk onto the shaft can be applied to the press plate, for example, via an external press and/or a boosting mechanism which is connected in between, for example a lever. It is provided, in particular, that the shaft is plugged with its first end into the press table in an automated manner with the aid of a robot. To this end, the press table has, in particular, an insertion bevel. The centering receptacle is preferably plugged automatically onto the second end of the shaft. To this end, the centering receptacle may have an insertion bevel. A force profile of the centering receptacle during plugging onto the second shaft end can be monitored to ensure that the centering receptacle actually has captured the second end projecting from the press table, and there is no fault. In addition, it is possible for a suitable sensor system to be provided in a receptacle of the press table. The sensor system can detect the first shaft end that is plugged in the receptacle of the press table and can also detect the correct orientation of the shaft, before permitting a start of pressing of the disk onto the shaft by way of the joining tool.

The disk can be threaded with play onto a conical region at the second end of shaft. The two ends of the shaft then can be fixed, and the disks subsequently can be pressed onto a greater diameter of the shaft and/or an axial region that has the structure elements. A force fit or press fit can be provided between the disk and the shaft during the pressing-on operation. A shrink fit also can be achieved by heating the disk and/or cooling the shaft sufficiently to provide a clearance between the disk and the shaft during the pressing-on operation. A shrink fit is achieved in the non-tempered state when both the disk and the shaft are at the same temperature. Reaching the desired temperature of the disk and/or of the shaft can be monitored by a temperature sensor.

The disk can be lubricated with a lubricant, such as a lubricating oil, to avoid unnecessary mechanical resistance when pressing the disk onto the shaft. Accordingly, a lubricating device that can be moved together with the press plate may be provided. The lubricating device can apply a lubricant film to the shaft during a return movement of the press plate after pressing the disk onto the shaft. A chip detection sensor is provided in some embodiments and may move together with the press plate. The chip detection sensor may operate optically. Detection of a chip that has detached from the shaft and/or from the disk indicates significant damage and an operational malfunction, thereby causing an immediate termination of the pressing-on operation.

The ram may have a segmented contact face for contacting the disk. In particular, the ram may have radially spaced contact ring faces and intermediate spaces between the segmented contact faces for receiving elastically deformed material of the ram. The ram can have an undulating cross-sectional profile in the radial direction, for example, in a sectional plane along a radial plane that is perpendicular to the axis of the shaft. The undulating cross-sectional profile may define concentric annular contact faces that are spaced from one another in the radial direction. Thus, part segments are formed on the side of the ram that points toward the disk. The part segments achieve touching contact, but other part segments do not achieve touching contact. A sufficient transmission of force between the press plate and the disk via the ram can take place via the segmented contact faces. Additionally, a sufficiently large intermediate space is provided on the edge of the contact face and can receive the elastically deformed material of the ram that yields under load. The ram of some embodiments is produced from an elastomeric and/or rubber-elastic material, for example hard rubber. The ram can act directly on the disk. However, an intermediate ring produced, for example, from a copper alloy or steel may be provided between the ram and the disk. The disk can bear against the intermediate ring over a large area. Thus, an upper lamination of the disk is unlikely to be detached. The intermediate ring can have a play with respect to the shaft so that the intermediate ring cannot make contact with and/or damage the shaft.

The ram of some embodiments is produced from an elastomeric and/or rubber-elastic material and may be compressible locally by 0.1 mm≤Δε≤10.0 mm, in particular 0.5 mm≤Δε≤5.0 mm and preferably Δε=2.0 mm±0.2 mm, in the case of a pressing force F of 10 kN≤F≤100 kN. The disk may have an axial run-off of, for example, approximately from 0.2 mm to 1.0 mm in the axial direction between the farthest projecting point and the least projecting point of the end side that is sloped with respect to the radial plane of the shaft. As a result, a correspondingly low elastic deformation of the ram is sufficient in the case of the pressing forces that are to be expected. As a result, the ram can be comparatively hard and can transmit correspondingly high forces without significant plastic deformation.

The ram of some embodiments is annular and spaced radially from the shaft. More particularly, the ram may be provided exclusively in a radially outer region of the disk. For example, an annular ram may be provided in the outer half of the radius in the radius region between the radially inner and the radially outer radius of the disk. As a result, force introduced into the disk can take place as far as possible on the outer circumference of the disk. Accordingly, a substantially constant stress distribution can be achieved even if the disk is sloped with respect to the radial plane of the shaft.

The centering receptacle of some embodiments is guided in the press plate to permit axial displacement while avoiding tilting. As a result, the shaft can remain immovable during the movement of the press plate and remains correctly oriented. The centering receptacle can be supported on the press plate in the radial direction. For example, a plain bearing may be between the press plate and the centering receptacle.

Guide elements may be provided for positioning the disk in the circumferential direction relative to the shaft and for preventing rotation of the disk in the circumferential direction relative to the shaft during the pressing-on operation. The guide elements may be project from the surface of the press plate that faces the disk and can engage into one or more corresponding cavities of the disk. In particular, the guide elements can be moved circumferentially in defined increments. Thus, various disks can be pressed on with a defined circumferential offset. Accordingly, the disks can be identical parts that have permanent magnets offset circumferentially with respect to one another on the outer circumference. As a result the permanent magnets of different disks can be slightly offset with respect to one another in the circumferential direction to improve smooth running of a rotor shaft of an electric machine.

A force gage may be provided for measuring a counterforce that acts on the press plate. The force gage may be connected to a control device for ending the pressing of the disk onto the shaft in the case of a suddenly increasing counterforce and/or in the case of an implausible force-displacement profile. As a result, the press plate can displace the disk along the axial direction of the shaft until the disk comes to bear against a stop or other body, such as a disk that previously was pressed on. The contact leads to a suddenly increasing resistance that can be detected by the force gage. Thus, damage of the disk that has just been pressed on and disks that previously were pressed on can be avoided. A cooling intermediate space can be provided between the end sides that have an axial run-off but are oriented toward one another in an orientation of the plane that is rotated in the circumferential direction. Thus, plastic deformation of the disks that fill the intermediate space can be avoided. In addition, the force gage can measure a force-displacement profile over time and can compare it with a force-displacement profile to be expected and/or a fundamental shape to be expected of a force/displacement profile to detect an unexpected fault. For example, a pulsating force-displacement profile and/or significantly excessive measured values for the applied force can indicate a fault. Thus, the structural unit consisting of the shaft and the pressed-on disk can be discharged automatically as a reject part that does not meet the quality requirements.

The invention also relates to a rotor shaft for an electric machine, and a rotor shaft that can be produced by a joining tool and/or a method as described in the preceding text. The shaft has a threading region for threading on disks with radial play and a fastening region offset axially with respect to the threading region. The fastening region has radially projecting structure elements for fastening the disks. Each disks may have an axial run-out. The disks are fastened to the shaft in the fastening region by way of a plastic deformation on the structural elements in a positively locking manner in the circumferential direction and in a non-positive manner in the radial direction by way of a shrink fit and/or force fit. The rotor shaft can be configured as described in the preceding text on the basis of the production with the aid of the joining tool. The resilient ram of the joining tool enables the disk that has an axial run-out to be pressed in a correspondingly sloped manner onto the shaft to achieve a rotor shaft with a satisfactory bond.

An intermediate space may be defined between adjacent disks due to the axial run-out. The planes of those end sides of the disks that point toward one another can be positioned such that they are rotated, for example by substantially 180° in the circumferential direction in relation to a mutually parallel relative position with respect to one another. This can result in an intermediate space that is substantially wedge-shaped between the end sides, which point toward one another, of the disks which follow in the axial direction. The intermediate space can achieve improved cooling of the disk during running operation of a rotor of an electric machine.

Rib-shaped structural elements of some embodiments run in the axial direction of the shaft and point radially to the outside along a conical area that tapers toward the threading region. This configuration avoids a situation where the depressions that are generated by way of the plastic deformation on the structure elements on the radially inner edge of the disk can widen and loosen more and more in the case of a relatively long displacement on the structure elements. Thus, a decline of the bond of the disk to the shaft can be avoided, and an identically satisfactory bond can be achieved for each disk in any desired axial section of the fastening region.

In the following text, the invention will be described by way of example on the basis of preferred exemplary embodiments with reference to the appended drawings, it being possible for the features shown in the following text to represent an aspect of the invention both in each case individually and in combination.

DETAILED DESCRIPTION

Figure 1:
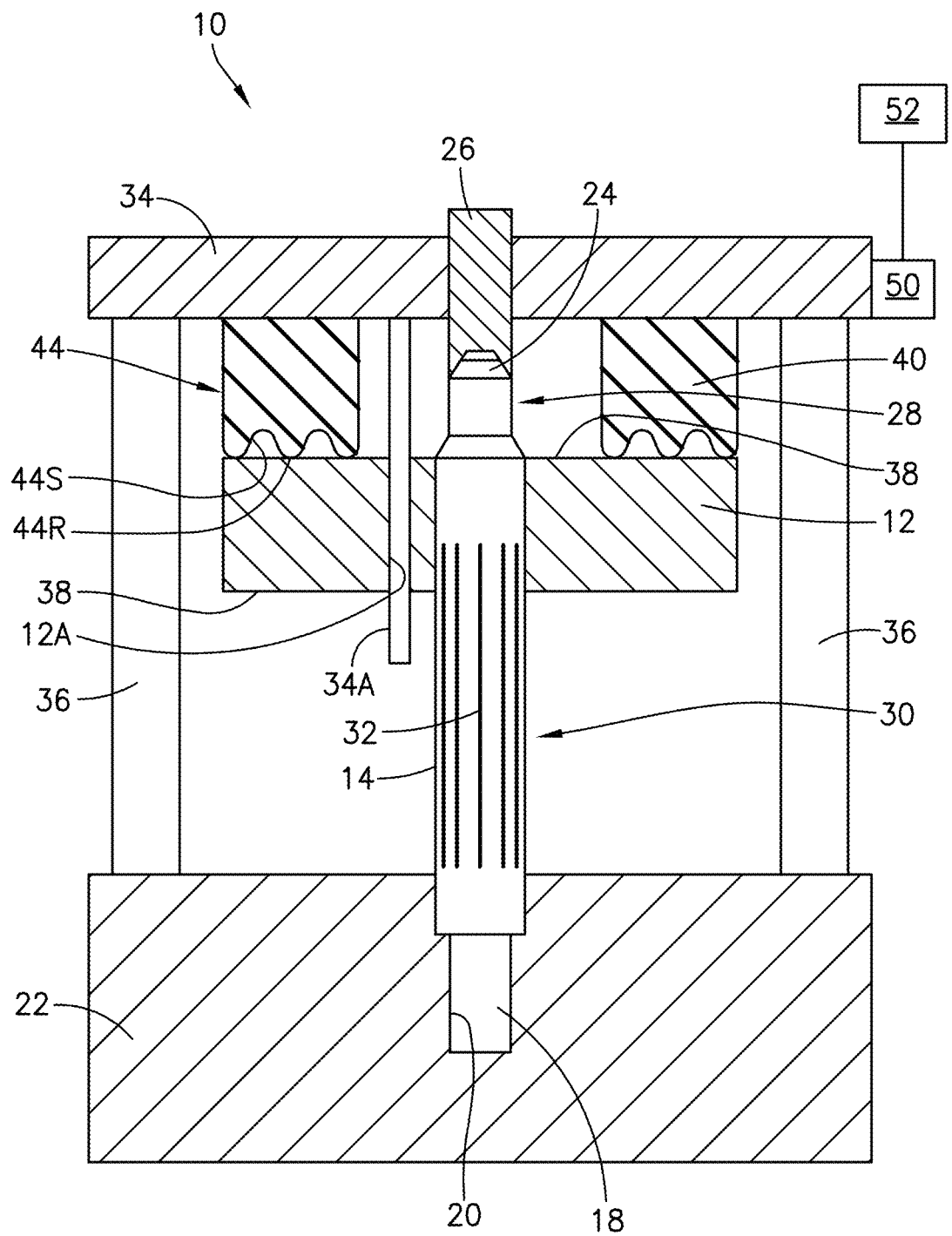
FIG. 1 is a diagrammatic sectional view of a joining tool.

FIG. 1 shows a joining tool 10 that can press disks 12 to a shaft 14 to produce a rotor shaft 16 for an electric machine of a motor vehicle, such as a motor vehicle that can be driven electrically. Each disk 12 can have an axial run-out. To this end, the shaft 14 can be inserted at a first end 18 in a receptacle 20 of a press table 22, and can be inserted at an opposite second end 24 in a centering receptacle 26. Thus, the shaft 14 can be positioned fixedly. The disk 12 can be plugged with play on a threading region 28 of the shaft 14. The threading region 28 can be adjoined by a fastening region 30 that has rib-shaped structural elements 32 projecting radially to the outside and running in the axial direction. A press plate 34 is actuated, in particular, hydraulically, to press the disk 12 axially onto the fastening region 30 of the shaft 14. As a result, the structural elements 32 of the shaft 14 dig into the material of the disk 12 on the radially inner edge and produce a bond that is positively locking in the circumferential direction in the manner of a spline system. The press plate 34 can be moved in a linearly parallel manner with respect to a designated rotational axis of the shaft 14 on guide columns 36 that are connected to the press table 22. Guide elements 34A may be provided for positioning the disk 12 in the circumferential directive to the shaft 30 and for preventing rotation of the disk 12 in the circumferential direction relative to the shaft 30 during pressing-on operation. The guide elements 34A may be project from the surface of the press plate 34 that faces the disk 12 and can engage into one or more corresponding cavities 12A of the disk 12. A force gage 50 may be provided for measuring a counterforce that acts on the press plate 34. The force gage 50 may be connected to a control device 52 for ending the pressing of the disk 12 onto the shaft 30 in the case of a suddenly increasing counterforce and/or in the case of an implausible force-displacement profile. As a result, the press plate 34 can displace the disk 12 along the axial direction of the shaft 12 until the disk comes to bear against a stop or other body, such as a disk that previously was pressed on. The contact leads to a suddenly increasing resistance that can be detected by the force gage 50. Thus, damage of the disk 12 that has just been pressed on and disks that previously were pressed on can be avoided. One or more lubricating devices can be mounted to the press plate 34 near the shaft 30. The lubricating device can apply a lubricant film to the shaft 30 during a return movement of the press plate 34 after pressing the disk 12 onto the shaft 34. A chip detection sensor also may be provided on the press plate 34. The chip detection sensor may operate optically. Detection of a chip that has detached from the shaft 30 and/or from the disk 12 indicates significant damage and an operational malfunction. Thus, the chip detection sensor sends a signal to the control device 52 either via wires or wirelessly causing an immediate termination of the pressing-on operation.

The disk 12 has a deliberate or knowingly accepted axial run-off. The end surfaces 38 of the disk 12 can be sloped with respect to a radial plane of the shaft 14. In this regard, the radial plane of the shaft 14 is perpendicular to the rotational axis of the shaft 14. An annular ram 40 produced from a slightly resilient material is provided between the press plate 34 and the disk 12 so that the correct orientation of the radially inner edge of the disk 12 with respect to the shaft 14 is not lost during the pressing-on operation of the disk 12. The ram 40 is dimensioned and disposed to act, to the extent possible, on the outer circumference of the disk 12, possibly via an intermediate ring. The end of the ram 12 that faces toward the press table 22 can be configured to define a segmented contact face 44. The segmented contact face 44 is configured, for example, by way of concentric rings 44R that are spaced apart from one another by spaces 44S and, in the sectional view which is shown, define an undulating profile in the radial direction of the side of the ram 40. As a result, the ram 40 can be compressed easily to a more pronounced effect in the one circumferential angle region and to a less pronounced extent in another circumferential angle region thereby compensating for the axial run-off of the disk 12 during the pressing-on operation.

Figure 2:
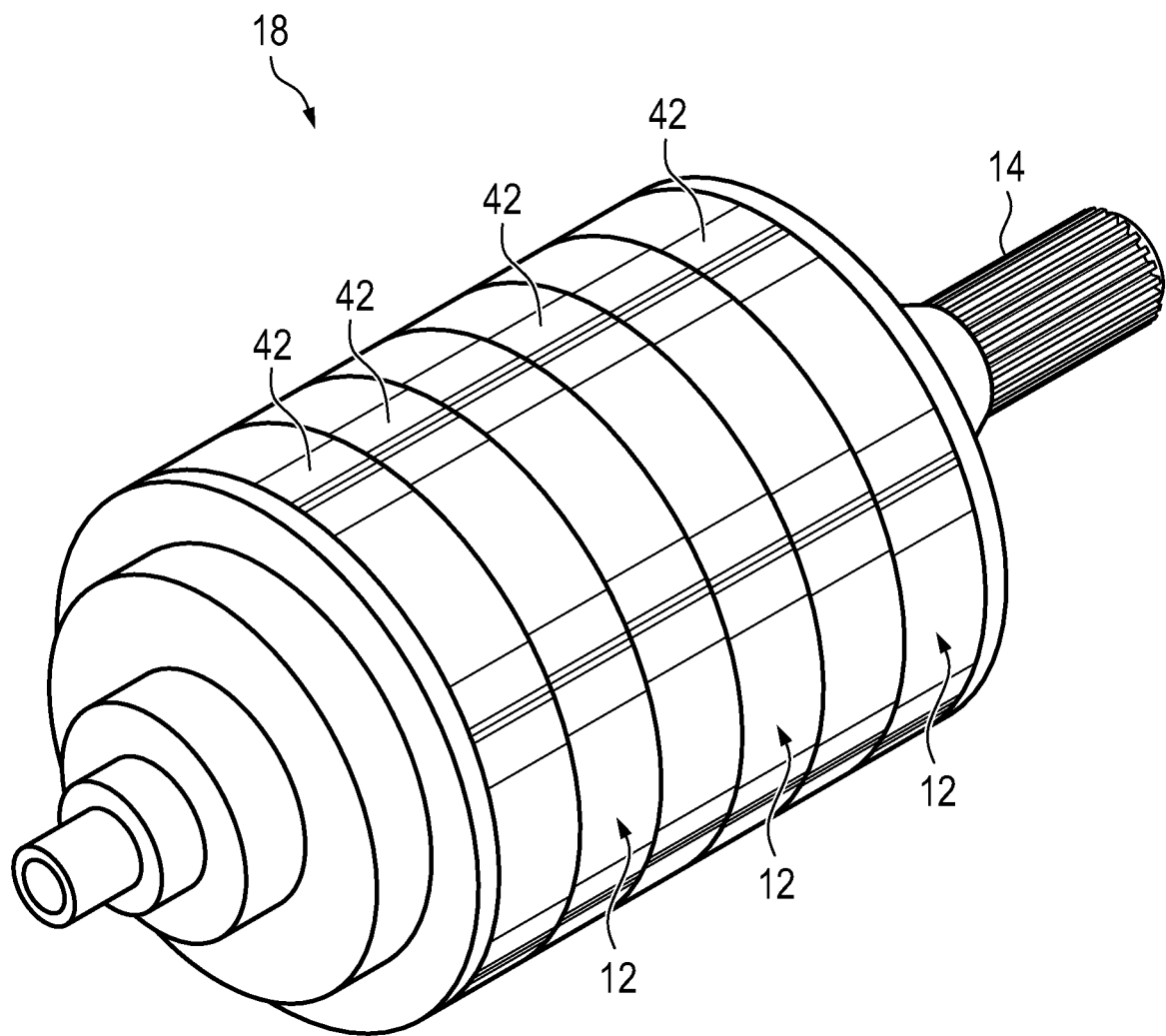
FIG. 2 is a diagrammatic perspective view of a rotor shaft that can be produced with the aid of the joining tool of FIG. 1.

As is shown in FIG. 2, disks 12 that have a plurality of permanent magnets 42 are produced and can be pressed to the shaft 14 with the aid of the joining tool 10. Adjacent disks 12 can be pressed on in a manner rotated in the circumferential direction with respect to one another. As a result, the permanent magnets 42 that follow one another in the axial direction are arranged offset slightly in the circumferential direction with respect to one another and not exactly behind one another.

What is claimed is:

1. A joining tool for pressing a disk (12) to a shaft (14), the shaft having opposite first and second ends (18, 24), the joining tool comprising:
   a press table (22) for receiving the first end (18) of the shaft (14) in a nonrotatable manner;
   a centering receptacle (26) for receiving the second end (24) of the shaft (14);
   a press plate (34) for axially pressing the disk (12) onto the shaft (14); and
   a resilient ram (40) formed from an elastically deformable material and provided on a side of the press plate (34) facing toward the disk (12) for compensating for an axial run-out of the disk (12) relative to the press plate (34).

2. The joining tool of claim 1, wherein the ram (40) has a segmented contact face (44) with contact rings (44R) spaced radially from one another and facing toward the disk (12), intermediate spaces (44S) being defined between the contact rings (44S) for receiving the elastically deformable material of the ram (40).

3. The joining tool of claim 1, wherein that the ram (40) is produced from an elastomeric and/or rubber-elastic material selected so that the ram (40) is compressible locally by 0.1 mm≤Δε≤10.0 mm in response to a pressing force F of 10 kN≤F≤100 kN.

4. The joining tool of claim 3, wherein the ram (40) is produced from an elastomeric and/or rubber-elastic material selected so that the ram (40) is compressible locally by 0.5 mm≤Δε≤5.0 mm in response to a pressing force F of 10 kN≤F≤100 kN.

5. The joining tool of claim 4, wherein the ram (40) is produced from an elastomeric and/or rubber-elastic material selected so that the ram (40) is compressible locally by Δε=2.0 mm±0.2 mm in response to a pressing force F of 10 kN≤F≤100 kN.

6. The joining tool of claim 1, wherein the ram (40) is configured annularly and is spaced radially from the shaft, the ram (40) being dimension to be provided exclusively in a radially outer radius region of the disk (12).

7. The joining tool of claim 1, wherein the centering receptacle (26) is guided axially displaceably in the press plate (34).

8. The joining tool of claim 1, further comprising guide elements (34A) that can engage into cavities (12A) of the disk (12) for positioning the disk (12) in a circumferential direction relative to the shaft (14), the guide elements (34A) being connected to the press plate (34).

9. The joining tool of claim 1, further comprising a force gage (FG) for measuring a counterforce that acts on the press plate (34), the force gage (FG) being connected to a control device (CD) for ending the pressing of the disk (12) onto the shaft (14) in response to at least one of a suddenly increasing counterforce and an implausible force-displacement profile.

* * * * *